(12) United States Patent
Gazzard

(10) Patent No.: US 7,983,675 B2
(45) Date of Patent: *Jul. 19, 2011

(54) SYSTEM AND METHOD FOR PROVIDING INTELLIGENT CELL RESELECTION FOR DELAY SENSITIVE DATA APPLICATIONS

(75) Inventor: Daryl Robert Gazzard, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,006

(22) Filed: Feb. 11, 2010

(65) Prior Publication Data

US 2010/0136977 A1  Jun. 3, 2010

Related U.S. Application Data

(63) Continuation of application No. 10/946,776, filed on Sep. 21, 2004, now Pat. No. 7,689,221.

(60) Provisional application No. 60/550,352, filed on Mar. 5, 2004.

(51) Int. Cl.
*H04W 36/00* (2009.01)

(52) U.S. Cl. ........................... 455/437; 455/436

(58) Field of Classification Search .......... 455/436, 455/437, 525; 370/331, 332
See application file for complete search history.

(56) References Cited

U.S. PATENT DOCUMENTS

| | | | |
|---|---|---|---|
| 5,260,943 A * | 11/1993 | Comroe et al. | 370/332 |
| 5,379,447 A * | 1/1995 | Bonta et al. | 455/437 |
| 6,014,087 A | 1/2000 | Krishnakumar et al. | |
| 6,049,715 A * | 4/2000 | Willhoff et al. | 455/436 |
| 6,466,790 B2 * | 10/2002 | Haumont et al. | 455/437 |
| 6,473,411 B1 * | 10/2002 | Kumaki et al. | 370/331 |
| 6,799,039 B2 * | 9/2004 | Wu et al. | 455/436 |
| 6,842,441 B2 | 1/2005 | Balogh et al. | |
| 6,907,109 B2 | 6/2005 | Kotzin et al. | |
| 6,944,459 B2 | 9/2005 | Parantainen et al. | |
| 7,082,301 B2 * | 7/2006 | Jagadeesan et al. | 455/436 |
| 7,110,366 B2 | 9/2006 | Hulyalkar et al. | |
| 7,389,111 B2 * | 6/2008 | Petrus | 455/436 |
| 2001/0026546 A1 | 10/2001 | Schieder et al. | |
| 2002/0197992 A1 | 12/2002 | Nizri et al. | |
| 2003/0040311 A1 * | 2/2003 | Choi | 455/434 |
| 2003/0072267 A1 | 4/2003 | Lohtia et al. | |
| 2004/0033805 A1 * | 2/2004 | Verma et al. | 455/444 |
| 2004/0038697 A1 | 2/2004 | Attar et al. | |
| 2004/0095905 A1 | 5/2004 | Pecen et al. | |
| 2004/0097233 A1 | 5/2004 | Pecen et al. | |
| 2005/0047370 A1 | 3/2005 | Kotzin et al. | |
| 2006/0165027 A1 | 7/2006 | Heden | |

\* cited by examiner

*Primary Examiner* — Lana N Le
*Assistant Examiner* — Ping Y Hsieh
(74) *Attorney, Agent, or Firm* — Parks IP Law LLC; Mickki D. Murray, Esq.

(57) ABSTRACT

A mobile station for receiving delay-sensitive data from a wireless communications network is provided with a data buffer and cell reselection controller. The data buffer receives data from the network and stores the data for communication to a delay-sensitive data application. The cell reselection controller selectively inhibits cell reselection in order to meet requirements of the delay-sensitive data application. By intelligently controlling cell reselection, delay sensitive data may be received in a more reliable fashion, thereby increasing performance of the data application.

19 Claims, 6 Drawing Sheets

SYSTEM AND METHOD FOR PROVIDING INTELLIGENT CELL RESELECTION FOR DELAY SENSITIVE DATA APPLICATIONS

CROSS-REFERENCE TO RELATED APPLICATIONS

This application is a continuation of U.S. application Ser. No. 10/946,776, filed Sep. 21, 2004, now U.S. Pat. No. 7,689,221, which claims the benefit of U.S. Provisional Application No. 60/550,352, filed Mar. 5, 2005. The entireties of both are herein incorporated by reference.

BACKGROUND

1. Field of the Invention

The present invention relates generally to data communications in a wireless communication system, and more particularly, to systems and methods of providing intelligent cell reselection for delay sensitive applications.

2. Description of the Prior Art

In today's wireless communications environment, data applications have become commonplace and widely used. Certain of these data applications, such as real time and streaming applications, are delay sensitive and have very strict requirements with respect to transfer data rate and jitter. If these requirements are not met, the performance of the application may degrade substantially, leading to, for example, interruptions of or dropouts in, data (e.g., audio or video) streams.

FIG. 1 illustrates jitter in a wireless communications network. A transmitted burst 100 of data includes multiple packets 110 of data. In a streaming application, such as video streaming from the Internet, the transmitted burst 100 includes data packets 110 transmitted in an orderly and time-sensitive fashion. Radio transmission errors inherent in a wireless communications interface between a cell and a mobile station such as multiuser interference, multipath fading, and shadowing, result in a jittered (i.e., delayed by a variable interval or lag time), received burst 120 at the mobile station. Radio transmission errors may be particularly acute near an edge of a cell or in a region of overlap between adjacent cells.

If the radio transmission errors are recoverable, a data buffer in the mobile station temporarily stores and retimes the received data packets 130, resulting in a retimed burst 140 with data packets 150 resembling the transmitted data packets 110, with no loss in data. However, if the radio transmission errors exceed a capacity of the data buffer, the resulting burst 160 includes data packets 170 and a missing data packet. 175. The radio transmission errors cause complications in the routing of data packets to the mobile station, because lost data packets may need to be retransmitted by the network.

FIG. 2A illustrates routing of data packets in General Packet Radio Service (GPRS)/Edge, in accordance with the prior art. Data packets intended for a mobile station 205 from a public data network such as the Internet reach a gateway GPRS support note (GGSN) 201 associated with a home network of the mobile station 205. Location information related to the mobile station 205 is stored in a GPRS register contained in a home location register (HLR) 210. The GGSN 201 determines a serving GPRS support note (SGSN) 215 serving the mobile station 205 (e.g., the SGSN A 215a), encapsulates the data packets, and forwards (i.e., tunnels) the data packets to the SGSN A 215a via a base station controller (BSC) 217 (e.g., the BSC 217a) to a base station 220 (e.g., the base station 220b) currently serving the mobile station 205.

The base station 220 currently serving the mobile station 205 is referred to as the "serving cell." As the mobile station 205 moves, for example from position 1 to position 2 in FIG. 2A, the mobile station 205 may select another base station 220d as the serving cell (i.e., perform cell reselection or handoff between cells), because each base station 220a-d covers a limited geographic area. As will be discussed with respect to FIG. 2C below, cell reselection may require retransmission of data packets, requiring significant network overhead and time delay in data transmission.

FIG. 2B illustrates a procedure for cell reselection for GPRS/Edge, in accordance with the prior art. At an initial step 225, the mobile station 205 measures a received signal strength of a broadcast control channel of the current serving cell (e.g., the base station 220a) and sixteen strongest neighboring cells 220 of FIG. 2A. At step 260, the mobile station 205 determines if the received signal strength of the current serving cell 220a is below a predetermined threshold. If the received signal strength of the current serving cell 220a is greater than that of its neighbor cells, the mobile station 205 continues to receive data packets from the current serving cell 220a. If the received signal strength of a neighboring cell 220 is sufficiently stronger than the current serving cell 220a, the mobile station 205 performs cell reselection. Generally, a new serving cell 220 represents the strongest received signal strength of the neighboring cells 220. The mobile station 205 determines independently of the network if the neighboring cell 220 is more suitable than the current serving cell 220.

FIG. 2C illustrates graphically a procedure for cell reselection in accordance with the prior art. When the mobile station 205 (FIG. 2A) performs cell reselection, the mobile station 205 changes is routing area. The mobile station 205 sends a routing area update request containing cell identity of the current serving cell (e.g., the base station 220a) and an identity of the existing routing area to a new SGSN 215 (e.g., the SGSN B 215b) of FIG. 2A. The SGSN B 215b requests an old SGSN (e.g., the SGSN A 215a of FIG. 2A) to provide the GGSN 201 (FIG. 2A) address and tunneling information of the mobile station 205. The new SGSN B 215b (FIG. 2A) then updates the GGSN 201 of the home network with the SGSN B 215b address and new tunneling information. The new SGSN B 215b also updates the home location register 210 (FIG. 2A). The home location register 201 cancels an information context for the mobile station 205 in the old SGSN A 215a and loads subscriber data to the new SGSN B 215b. The new SGSN B 215b acknowledges the mobile station 205, and requests the old SGSN A 215a to supply undelivered data for transmission to the mobile station 205 by the new SGSN B 215b.

A problem with the cell reselection procedure of FIG. 2A-2C is that there may be an outage coincident with cell reselection. Because duration of the cell reselection process can take many seconds (typically more than 2 seconds), cell reselection can introduce operationally significant delays in data transmission, leading to lost data packets and degradation of a delay-sensitive data application running on the mobile station 205. Lost data packets may require re-queuing of the data packets in the GGSN 201 or SGSN 215, or may result in dropped data packets (e.g., missing frames of audio/video) for the delay-sensitive data application. For example, in real time video applications, the cell reselection procedure may result in breaks in video feed and slow video updates.

A further problem with the cell reselection procedure of FIGS. 2B and 2C is that the mobile station 205 makes a determination of whether to reselect the serving cell independently of the network (i.e., the GGSN 201, the SGSN 215, and the cells 220). Because the cell reselection is independent of the network, the network may be forced to rapidly respond to the mobile station 205 in a new serving cell 220. This requires significant overhead in the network. The majority of existing wireless data transmission technologies, such as GSM/GPRS, do not adapt the cell reselection algorithm to accommodate the requirements of delay-sensitive applications.

Therefore, a need exists in industry to address the aforementioned deficiencies and inadequacies.

SUMMARY

The present invention provides a mobile station for receiving data from a wireless communication network, which includes a cell reselection controller ("controller") configured to control cell reselection in accordance with the requirements of a delay-sensitive data application that executes either on the mobile station or on a computing device connected to the mobile station. The delay-sensitive data application, which may take the form of, for example, a Voice-over-IP (VoIP) or streaming application, receives a flow of data from the network that is stored as data packets in a data buffer. The controller includes logic for determining whether cell reselection procedures in the mobile station should be selectively inhibited. The controller may accept as input any number of fixed and/or measured parameters, including without limitation data transfer rates required by the data application, historical delay data, data buffer states, and data flow rates. In the event that the controller determines that cell reselection will have an adverse effect on application performance, it executes actions to prevent cell reselection. The controller may be implemented in any suitable form, including a software layer or application programming interface.

DETAILED DESCRIPTION OF EXEMPLARY EMBODIMENTS

Figure 1:
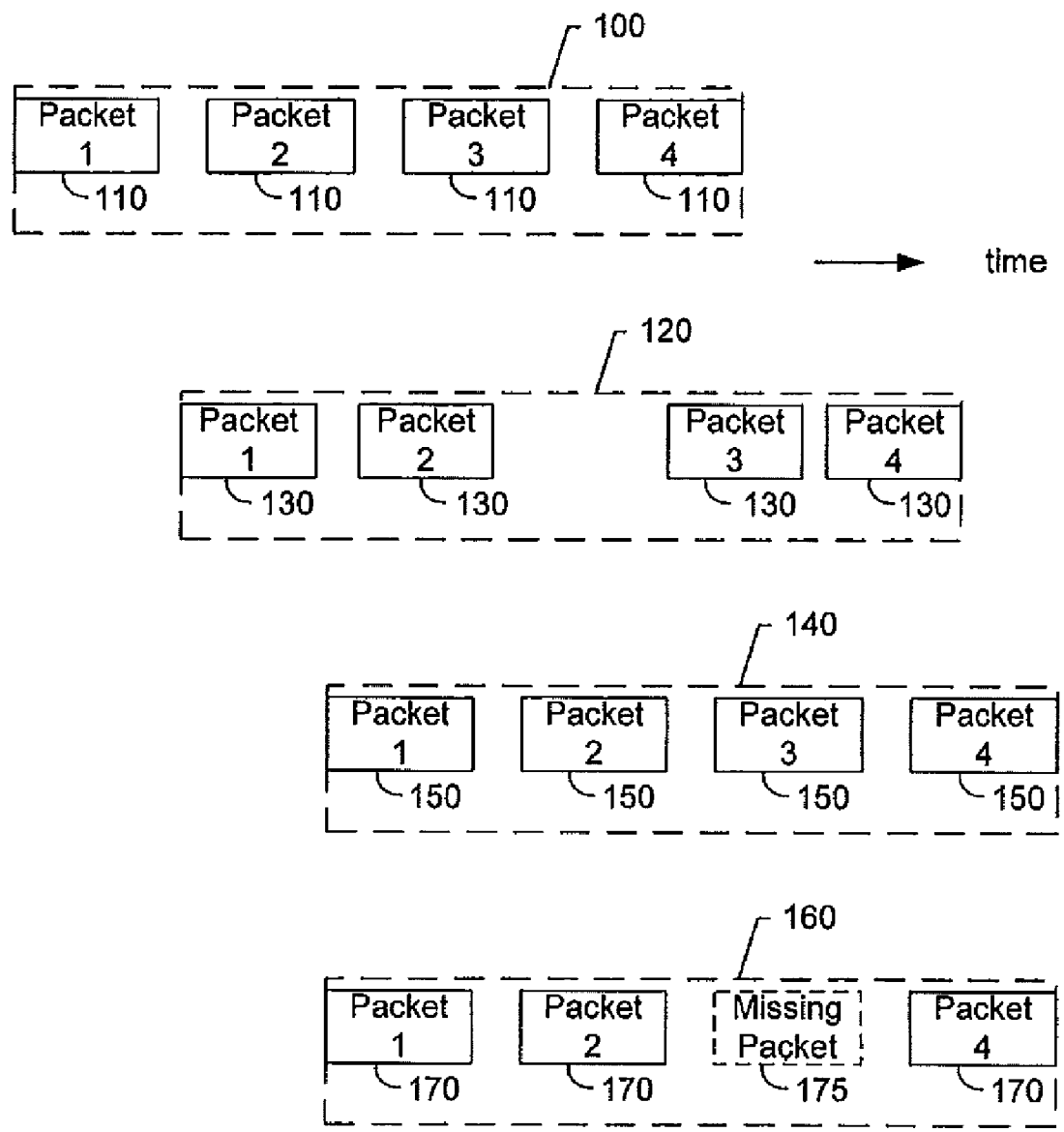
FIG. 1 illustrates a jitter in a wireless communications network.
Figure 2A:
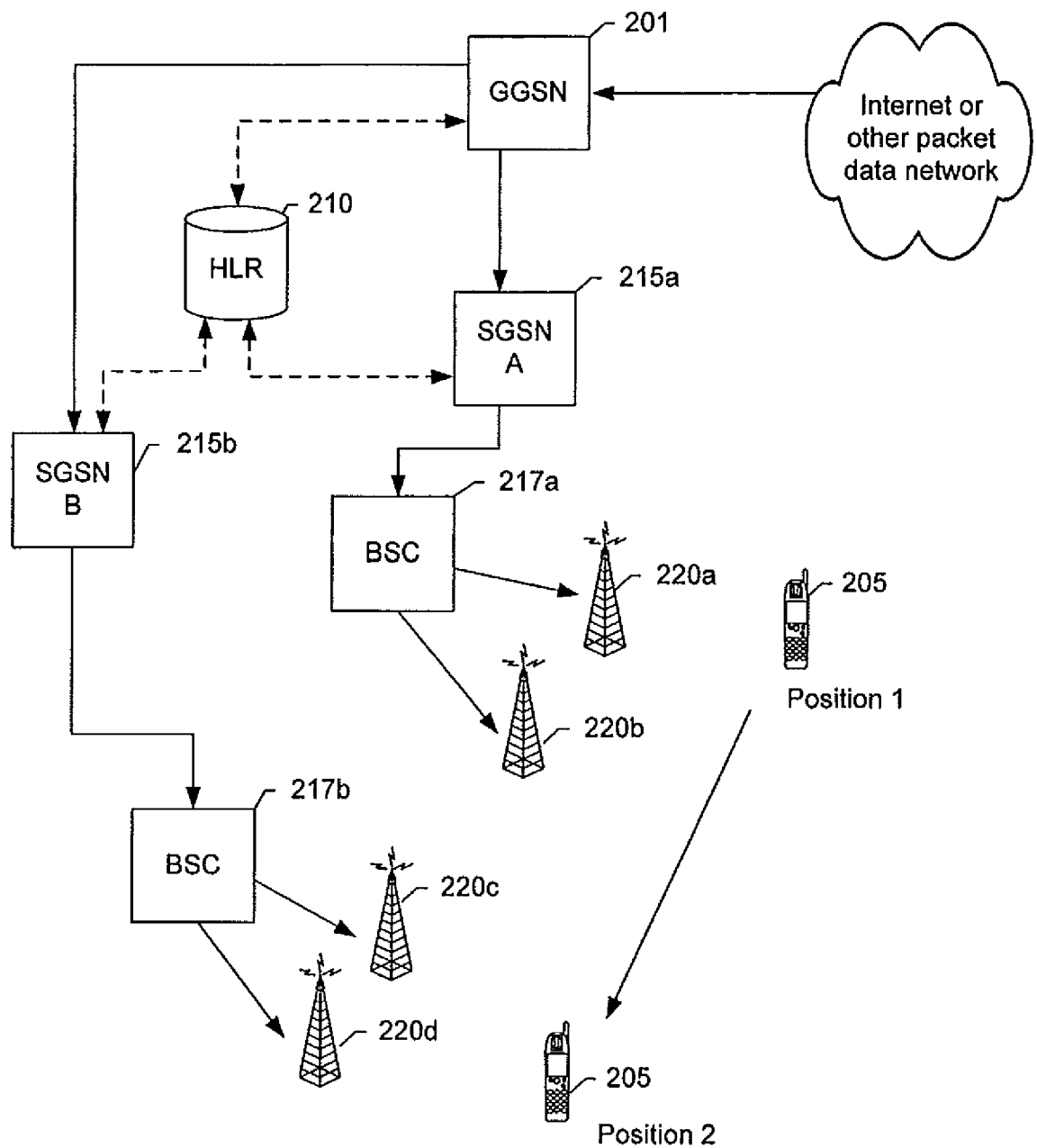
FIG. 2A illustrates routing of data packets in GPRS/Edge, in accordance with the prior art.
Figure 2B:
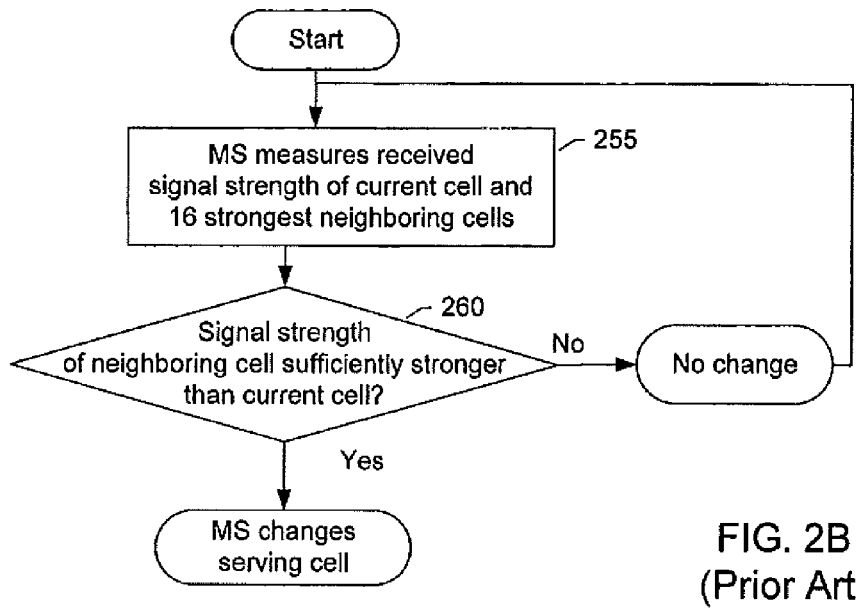
FIG. 2B illustrates a procedure for cell reselection for GPRS/Edge, in accordance with prior art.
Figure 2C:
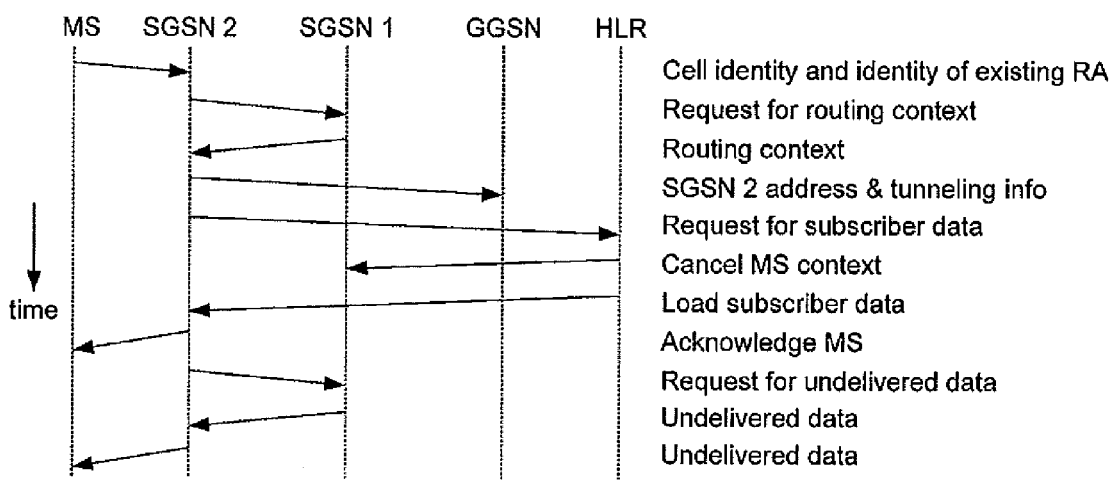
FIG. 2C illustrates graphically a procedure for cell reselection in accordance with the prior art.
Figure 3:
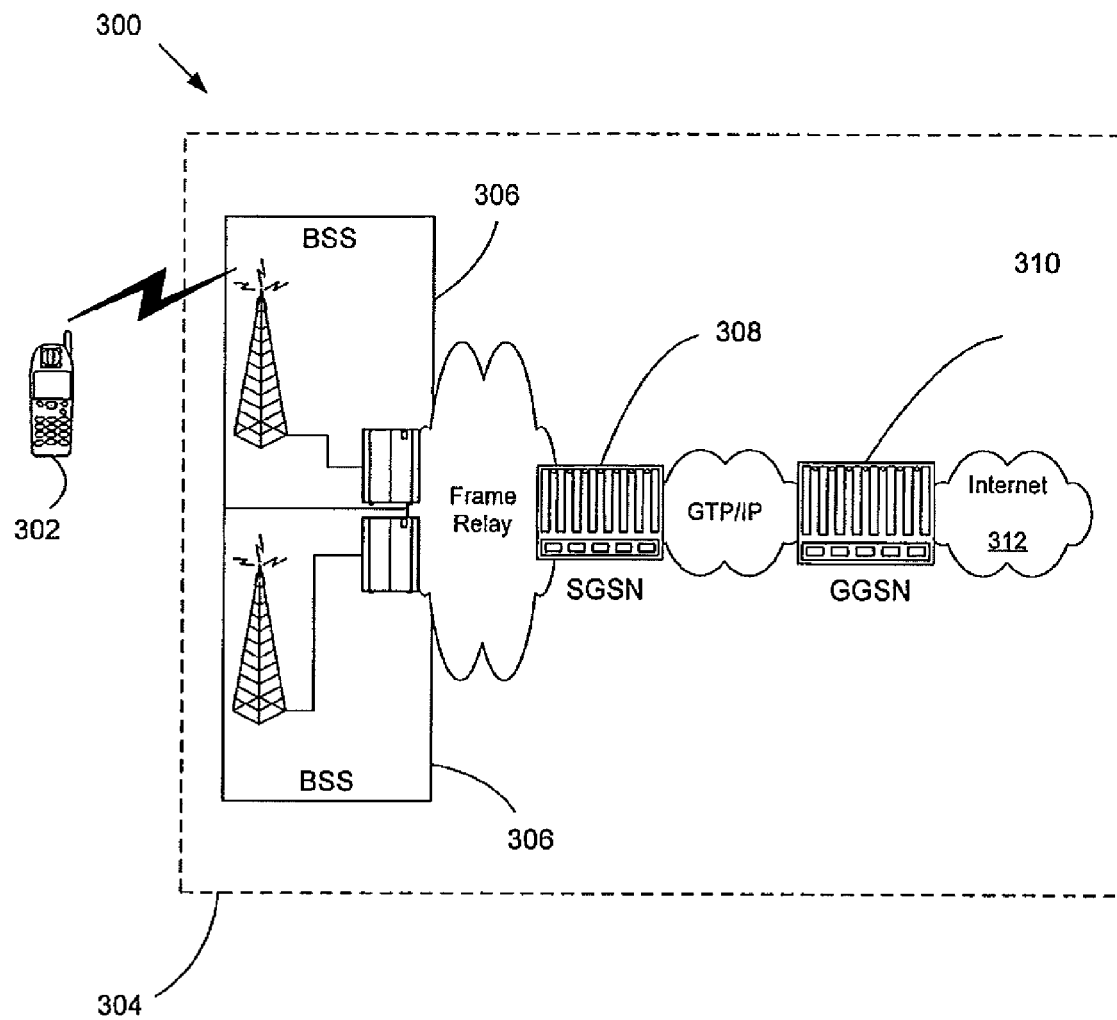
FIG. 3 depicts functional components of a GSM/GPRS wireless communications system 300 in which an embodiment of the present invention may be implemented.

FIG. 3 depicts functional components of a GSM/GPRS wireless communications system 300 in which an embodiment of the present invention may be implemented. A mobile station 302 transmits and receives voice and data communications to and from a network 304 over a wireless connection. The mobile station 302 may be any suitable device used to access network services over the wireless connection, including without limitation, a mobile station or a laptop computer equipped with a GPRS card. The network 304 includes a base station subsystem 306 comprising a base station controller and one or more base transceiver stations. One of the base transceiver stations (i.e., cells) of the base station subsystem 306 acts as a serving cell for the mobile station 302, and communicates data to the mobile station 302 from a frame relay backbone. The frame relay backbone is coupled to a serving GPRS support node (SGSN) 308, which routes the data from a global GPRS support node (GGSN) 310 over GPRS Tunneling Protocol/Internet Protocol (GTP/IP). The GGSN 310 is, in turn, connected to the Internet 312. Using this architecture, the Internet 312 can communicate data to the mobile station 302. It will be appreciated that transport protocols in the network 304 may include, for example without limitation, asynchronous transfer mode (ATM) and Internet protocol (IP).

It will also be appreciated that the network 304 of FIG. 3 may deliver data to the mobile station 302 via any of the serving cells, depending upon the received signal strength measured at the mobile station 302, as described herein. Further, it will be appreciated that the process of cell reselection described below is performed between the mobile station 302, a base station acting as a serving cell, and one of a number of neighboring cells.

While embodiments of the patent invention are described herein with reference to their implementation in a conventional GSM/GPRS system, it should be appreciated that the present invention may be implemented in connection with any number of wireless data communication technologies, including without limitation Cellular Digital Packet Data (CDPD), Universal Mobile Telecommunications System (UMTS), WLAN, EDGE and 3GPP. Furthermore, while the present invention is described and depicted in the context of wireless communications between a mobile station and a fixed infrastructure network, the present invention may also be applied to peer-to-peer communications (i.e., communications that take place directly between two mobile stations).

Figure 4:
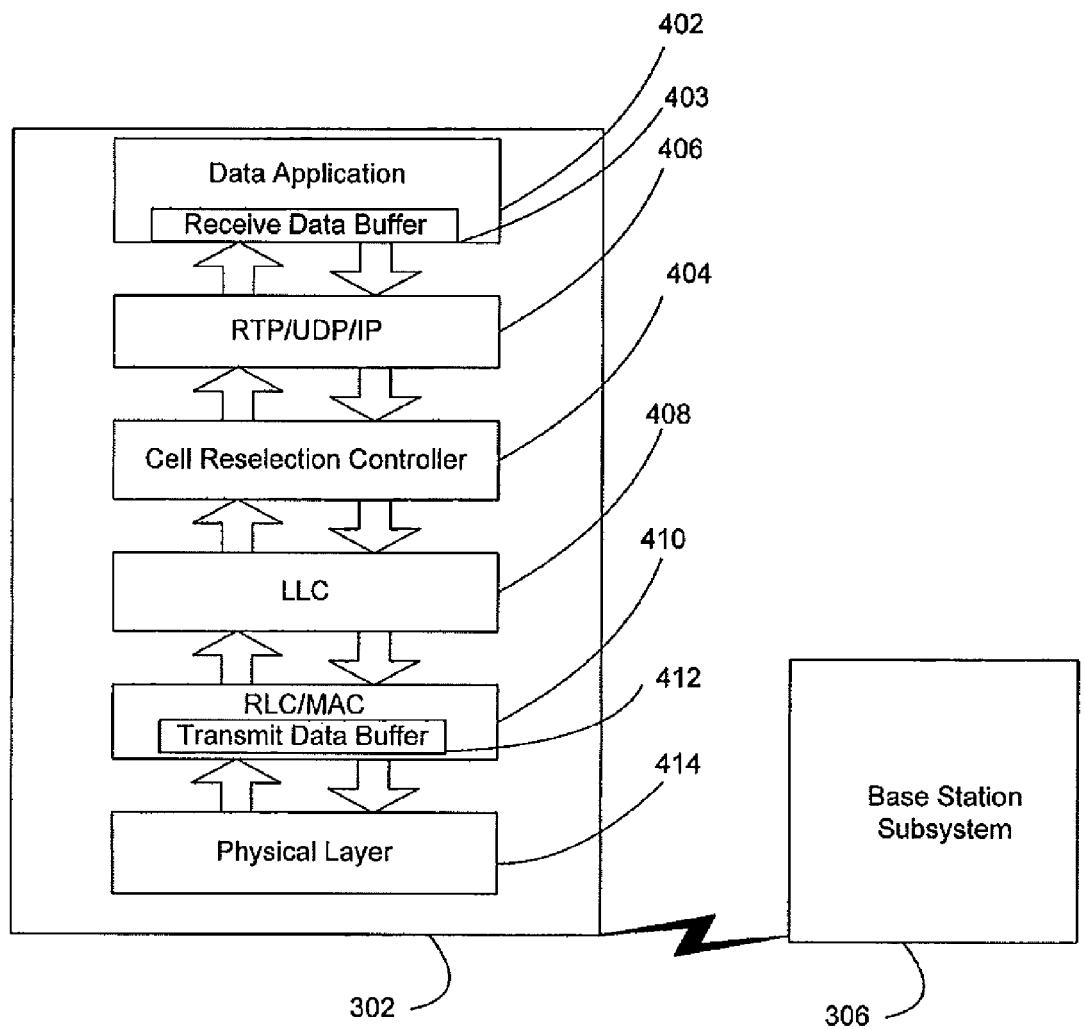
FIG. 4 depicts software layers residing on the mobile station 302 of FIG. 3, in accordance with one embodiment of the present invention.

FIG. 4 depicts software layers residing on the mobile station 302, in accordance with one embodiment of the present invention. The software layers each contain sets of instructions for performing prescribed functions, and are executable on one or more processors disposed in or coupled to the mobile station 302. The software layers include, at the topmost extent, at least one data application 402. For the purpose of description, the data application 402 is assumed to be a delay-sensitive application, meaning that it receives and/or transmits data having a temporal aspect, and that delays or jitter in data communication with the data application 402 can cause degradation in performance of the data application 402. By way of example, the data application 402 may take the form of a Voice over Internet Protocol (VoIP) application, a peer-to-peer application such as push-to-talk, or an audio/video streaming application. It will be appreciated that the data application 402 need not necessarily reside and be executed on the mobile station 302; in an alternative configuration, the data application 402 may reside and be executed on a computing device that is connected to the mobile station 302 through an appropriate interface.

The data application 402 receives a flow of data organized into data packets (for example, a speech or audio/video stream), via a receive data buffer 403 from a protocol stack. A conventional protocol stack may include a Real-Time Transport Protocol/User Datagram Protocol/Internet Protocol (RTP/UDP/IP) layer 406, a Logical Link Control (LLC) layer 408, and a Radio Link Control/Media Access Control (RLC/MAC) layer 410. The function and operation of these layers are known in the art and need not be discussed herein. A transmit data buffer 412 temporarily stores the data packets to be sent by the protocol stack to the base station subsystem 306. A lowermost physical layer 414 corresponds to a physical connection over which the data packets are sent from the serving cell to the mobile station 302.

In one embodiment, the mobile station 302 is provided with a cell reselection controller ("controller") 404 that intelligently determines whether cell reselection will cause an unacceptable delay in reception of the data packets from the serving cell, and, if it so determines, prevents initiation of cell reselection. In one embodiment, the controller 404 is implemented on a programmed general-purpose computer. In other embodiments, the controller 404 is implemented on a special purpose computer, a programmed microprocessor, a microcontroller and peripheral integrated circuit elements, an ASIC or other integrated circuit, a digital signal processor, a hardwired electronic or logic circuit such as a discrete element circuit, or a programmable logic device (e.g., a field programmable gateway array).

The controller 404 is provided with appropriate logic for making the cell reselection determination based upon various inputs. The inputs may include application requirements, data flow rates, transmission rates, receive data buffer 402 and/or transmit data buffer 412 states, and estimated cell reselection times. Exemplary application requirements may include implied human behavior (e.g., pressing a button/silence suppression or voice activity), and/or be based on parameters pertaining to the data application 402, receive data buffer 403, and/or the transmit data buffer 412.

In one embodiment, the controller 404 interfaces to an application programming interface (API) (not shown). The API is configured to signal the controller 404 that the data application 402 is delay sensitive. Information such as size of the receive data buffer 403, size of the transmit data buffer 412, content type (e.g., voice, video etc.), or the like may be provided by the API to indicate that a particular data application 402 is delay sensitive. In some embodiments, the API is configured to query the data application 402 to obtain information about an expected number of data packets that are to be received from the physical layer 414 or sent to the protocol stack. The operation of the controller 404 and the API will be discussed in further detail below in connection with the FIG. 5 flowchart.

While the controller 404 is depicted herein as a software layer which sits between RTP/UDP/IP 406 and LLC 408, those skilled in the art will recognize that the controller 404 may be alternatively implemented in any number of forms, including without limitation as an ASIC or other integrated circuit. It should be further recognized that the functional components of the controller 404 may alternatively be integrated into the data application 402 or into one or more layers of the protocol stack.

Figure 5:
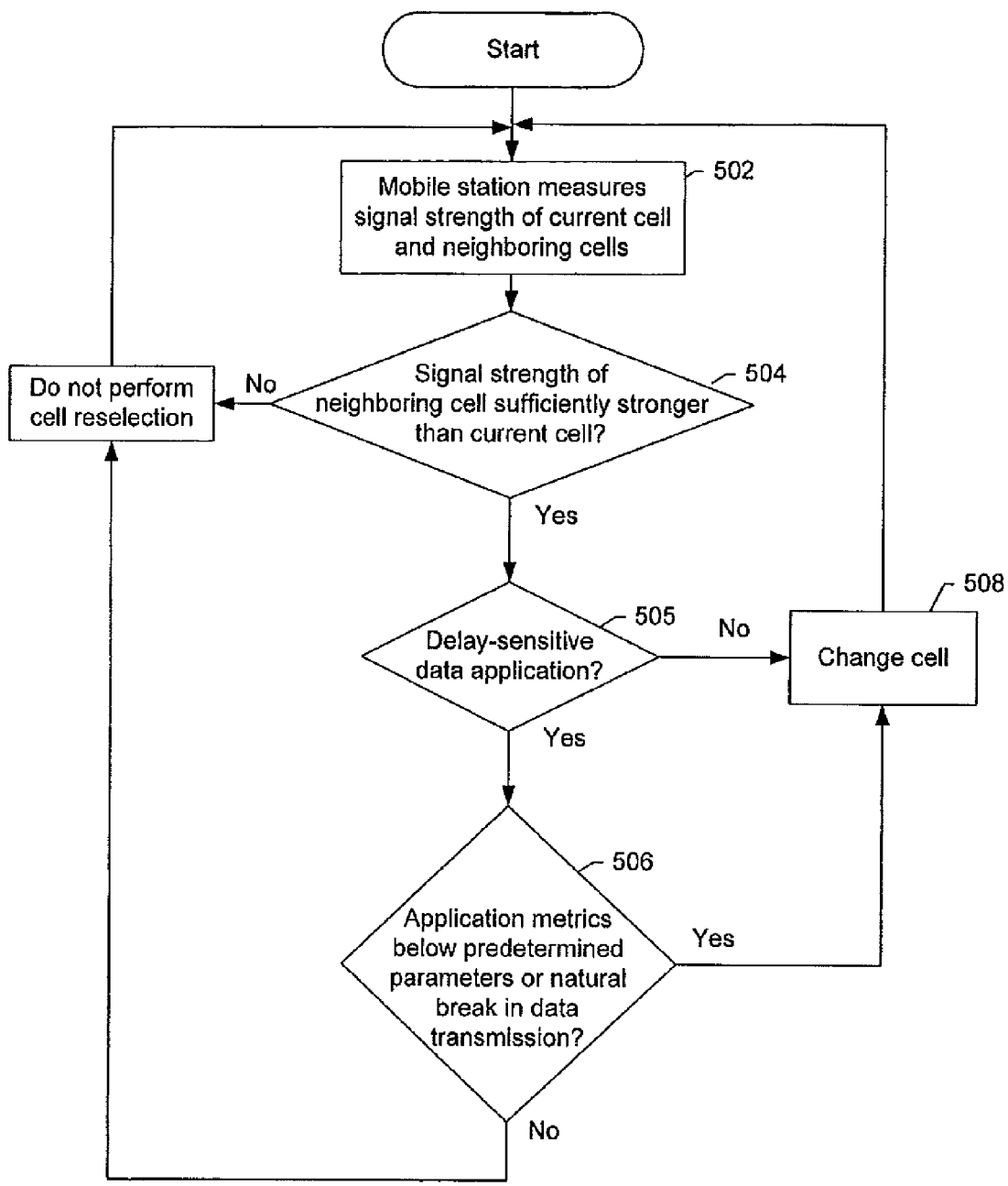
FIG. 5 is a flowchart depicting a process for controlling cell reselection, in accordance with embodiments of the present invention.

FIG. 5 is a flowchart depicting a process for controlling (e.g., selectively inhibiting) cell reselection, in accordance with embodiments of the present invention. The process depicted in the FIG. 5 flowchart is described with reference to its execution by the mobile station 302 and the several units of base station subsystem 306 of the network 304 of FIG. 3, but is not intended to be limited thereto.

For some delay sensitive data applications 402 (FIG. 4), cell reselection may result in data packet loss of greater than two seconds, and may cause a significant load on the network 304, for example, caused by packet retransmission. Accordingly, where cell reselection may cause loss of data packets, the process of FIG. 5 provides for maintaining the original transmission with the service cell while in an overlap region between neighboring cells, depending on the nature of the data application 402, as opposed to performing cell reselection. Accordingly, in some embodiments, the controller 404 (FIG. 4) prevents cell reselection unless application metrics of the data application 402 degrade sufficiently or a natural break is detected (e.g., between data bursts), rather than performing cell reselection in the middle of a burst transmission. The controller 404 analyzes various inputs provided by the mobile station 302 and/or the base station subsystem 306 and the associated network 304 to make its determination. These inputs may include, without limitation, data transfer rates required by the data application 402, present data flow and transmission rates, application state data, data burst length, and delay times associated with packet reception provided or measured by either the mobile station 302 or the network 304

In initial step 502, the mobile station 302 measures a received signal strength of a broadcast control channel of the serving cell and up to sixteen strongest neighboring cells. In another embodiment, the mobile station 302 measures the received signal strength of the broadcast control channel of the serving cell and any number of strongest neighboring cells. At stop 504, the mobile station 302 determines if the received signal strength of the serving cell's neighbor is sufficient for reselection. If the received signal strength of the serving cell's neighbor is not sufficient, the mobile station 302 continues to receive data packets from the serving cell. At step 505, if the data application 402 is not delay sensitive, the controller 404 may perform cell reselection in step 508. At step 506, if the received signal strength of the serving cell's neighbor is sufficient and the data application 402 is delay sensitive, the controller 404 determines if application metrics for the data application 402 are below predetermined parameters or if a natural break is detected. If so, then a cell change may occur in step 508.

In an alternative embodiment, the delay sensitive data application 402 communicates to the network 304 a set of predetermined operational parameters that are to be satisfied for determining whether to perform cell reselection. The mobile station 302 measures information of the received signal strength of the current serving cell and neighboring cells, and transmits the information to the network 304, upon consideration of applications requirements of the data application 402.

In some embodiments, the controller 404 or the network 304 estimates an expected time duration of cell reselection, and either the controller 404 or the network 304 determines to perform the cell reselection only if it can be performed without losing any data packets. For example, network-assisted cell selection may speed cell selection in the network 304. Accordingly, the controller 404 or the network 304 determines whether to perform cell reselection based partially upon whether network assisted cell change is supported in the network 304, and based upon an estimation of cell reselection duration.

In other embodiments, cell reselection is based on real time (i.e., computed) parameters as determined by the mobile station 302. That is, the mobile station 302 may change cells only if the real time parameters or requirements are not being met. Real time parameters may include for example, allowing streaming video to complete its data stream or allowing a burst to finish before performing cell reselection. For example, some protocols transmit the length of the data stream (e.g., the number of data packets) before sending the data packets. Accordingly, one embodiment includes a counter to track the number of data packets remaining to be received. In this embodiment, cell reselection is delayed until either the entire number of data packets is received or the received signal strength of the current cell measured by the mobile station 302 falls to such a level that errors are likely to occur in data packet reception.

In one embodiment, the predetermined parameters relate to Quality of Service (QoS) requirements. The data application 402 is programmed with an expected QoS and minimum QoS, and predictions are performed by the controller 404 to determine whether to perform cell reselection. The mobile station 302 of this embodiment will change cells when QoS requirements are not being met. In alternative embodiments, cell reselection occurs based on a combination of the real time and QoS parameters.

In a further embodiment, the controller 404 monitors a status of the receive data buffer 403 and/or the transmit data buffer 412 (FIG. 4). If either the receive data buffer 403 and/or the transmit data buffer 412 stop receiving new data or if the rate at which data packets are transmitted to or received from the upper protocol layers substantially exceeds the rate at which new data packets are added to the receive data buffer 403 and/or the transmit data buffer 412, the receive data buffer 403 and/or the transmit data buffer 412 will start to empty. Accordingly, the receive data buffer 403 and/or the transmit data buffer 412 are examined along with other parameters to determine whether the number of remaining data packets is approaching a number that will trigger initiation of the cell reselection process. For example, if the receive data buffer 403 contains data packets corresponding to five seconds of data received by the mobile station 302 to be streamed to the data application 402, and cell reselection is predicted to take only three seconds, then the mobile station 302 will perform cell reselection because the receive data buffer 403 will not empty during cell reselection. However, if the receive data buffer 403 contains only one second of data but cell reselection is predicted to take three seconds, then the mobile station 304 will remain in the current serving cell and perform cell reselection only if the QoS drops below a certain rate. This may involve real-time monitoring of the receive data buffer 403 and/or the transmit data buffer 412 state information (i.e., whether data packets are being received or sent, and the number of data packets currently queued). Alternatively and/or additionally, the controller 404 may detect or predict emptying of the receive data buffer 403 and/or the transmit data buffer 412 using measurements or estimates of data flow rates received by the data application 402 and rates of reception of data packets into the receive data buffer 403 and/or the transmit data buffer 412.

One factor which may be used by the controller 404 to determine if the cell reselection should be prevented is whether a natural break in the flow of data generated has occurred. A natural break is a temporary or permanent cessation of data flow associated with certain events or conditions that occur during normal operation of the data application 402. The natural break in data transmission may be, for example, a silent portion of the video, a break in streaming video, a button being released on the mobile station 302, completion of a burst in a VoIP application, completion of audio transmission, and/or any other natural break in transmission. The natural break may be defined by the delay sensitive data application 402 and/or any other higher or lower level application. The data application 402 may alert the controller 404 that a natural break has occurred by setting an appropriate flag. Alternatively, the controller 404 may monitor other aspects of the data application 402 operation to detect natural breaks. In some situations and in certain data applications, a natural break will have an associated duration sufficient to permit cell reselection without adversely affecting the performance of the data application 402.

The controller 404 is configured with logic that encodes a set of rules for intelligently determining from analysis of its inputs whether cell reselection should be allowed or prevented. Implementations of these rules will be apparent to those skilled in the art in view of the considerations of the data application 402 and the network 304 performance. Generally speaking, cell reselection should be inhibited where necessary to meet the data application 402 data transfer requirements; however, excessive inhibition of cell reselection may require the serving cell to transmit at high power and may prevent other mobile stations from accessing the serving cell, thereby adversely affecting overall network performance.

Those skilled in the art will recognize that various alternative methods may be available for preventing cell reselection. The method outlined above is presented by way of an illustrative example, and the present invention should not be construed as being limited to that or any other method as the sole means for cell reselection. It should also be recognized that although the FIG. 5 flowchart depicts steps 502-506 as occurring in sequence, certain of the steps may be performed concurrently.

It will be recognized by those skilled in the art that, while the present invention has been described above in terms of preferred embodiments, it is not limited thereto. Various features and aspects of the above invention may be used individually or jointly. Further, although the present invention has been described in the context of its implementation in a particular environment and for particular applications, those skilled in the art will recognize that is usefulness is not limited thereto and that the present invention can be beneficially utilized in any number of environments and implementations.

What is claimed is:

1. A non-transitory, computer-readable medium of a mobile station comprising computer-executable instructions that, when executed by a processor of the mobile station, cause the processor to perform steps of a method, comprising:
   receiving data at the mobile station from a serving cell of a wireless communications network, the data relating to a data application associated with the mobile station;
   measuring a serving cell signal strength of the serving cell;
   measuring a second signal strength of another cell;
   comparing the serving cell signal strength to the second signal strength;
   initiating cell reselection if:
      the data application does not comprise a delay-sensitive application;
      a break in the data received for the data application comprises a natural break; and
      the second signal strength is sufficient; and
   inhibiting the cell reselection if:
      the data application comprises the delay-sensitive application; and
      the cell reselection will result in loss of a data packet for the delay-sensitive data application.

2. The non-transitory, computer-readable medium of claim 1, wherein the instructions for inhibiting the cell reselection if the cell reselection will result in the loss of the data packet for the delay-sensitive data application further comprise instructions for determining that a break in the data received for the data application does not comprise a natural break.

3. The non-transitory, computer-readable medium of claim 1, wherein the instructions for inhibiting the cell reselection further comprise instructions for inhibiting the cell reselection based upon a network parameter.

4. The non-transitory, computer-readable medium of claim 3, wherein the instructions for inhibiting the cell reselection based upon the network parameter further comprise instructions for inhibiting the cell reselection based upon multiuser interference contributing to delay that could effect the delay-sensitive data application.

5. The non-transitory, computer-readable medium of claim 3, wherein the instructions for inhibiting the cell reselection based upon the network parameter further comprise instructions for inhibiting the cell reselection based upon multipath fading that contributes to delay that could effect the delay-sensitive data application.

6. The non-transitory, computer-readable medium of claim 3, wherein the instructions for inhibiting the cell reselection based upon the network parameter further comprise instructions for inhibiting the cell reselection based upon shadowing that contributes to delay that could effect the delay-sensitive data application.

7. The non-transitory, computer-readable medium of claim 3, wherein the instructions for inhibiting the cell reselection based upon the network parameter further comprise instructions for inhibiting the cell reselection based upon radio transmission errors that contribute to delay that could effect the delay-sensitive data application.

8. The non-transitory, computer-readable medium of claim 7, wherein the instructions for inhibiting the cell reselection based upon the network parameter further comprise instructions for inhibiting the cell reselection based upon the radio transmission errors occurring near an edge of the serving cell.

9. The non-transitory, computer-readable medium of claim 7, wherein the instructions for inhibiting the cell reselection based upon the network parameter further comprise instructions for inhibiting the cell reselection based upon the radio transmission errors occurring in a region of overlap between adjacent cells.

10. The non-transitory, computer-readable medium of claim 3, wherein the instructions for inhibiting the cell reselection based upon the network parameter further comprise instructions for inhibiting the cell reselection based upon a time required by the wireless communications network to reselect the cell.

11. The non-transitory, computer-readable medium of claim 1, wherein the instructions for inhibiting the cell reselection if the data application comprises the delay-sensitive application further comprise instructions for inhibiting the cell reselection if the data application comprises the delay-sensitive application, and based upon an operational parameter relating to a delay sensitivity of the delay-sensitive data application.

12. The non-transitory, computer-readable medium of claim 11, wherein the operational parameter comprises a quality of service (QoS) requirement of the data application.

13. The non-transitory, computer-readable medium of claim 1, wherein the data application comprises a voice-over-IP (VoIP) application.

14. The non-transitory, computer-readable medium of claim 1, wherein the data application comprises a streaming application.

15. The non-transitory, computer-readable medium of claim 14, wherein the streaming application is a video streaming application that streams video from the Internet.

16. The non-transitory, computer-readable medium of claim 14, wherein the streaming application is an audio streaming application that streams audio from the Internet.

17. The non-transitory, computer-readable medium of claim 1, wherein the data application comprises a peer-to-peer application.

18. The non-transitory, computer-readable medium of claim 1, wherein the wireless communications network comprises a Global System for Mobile communications (GSM) network that supports General Packet Radio Service (GPRS) and Enhanced Data rate for GSM Evolution (EDGE).

19. The non-transitory, computer-readable medium of claim 1, further comprising instructions for:
 storing the data in a data buffer of the mobile station for communication to the data application; and
 determining that the data application comprises the delay-sensitive data application based, at least partially, upon a status of the data buffer.

* * * * *